United States Patent [19]

Krohn et al.

[11] Patent Number: 4,704,265
[45] Date of Patent: Nov. 3, 1987

[54] PROCESS FOR THE MANUFACTURE OF CALCIUM CHLORIDE

[75] Inventors: James V. Krohn, Houston, Tex.; Melvin J. Heidner; Edward F. Pittman, both of Baton Rouge, La.; Landon S. Roberts, Lake Jackson, Tex.

[73] Assignee: The Dow Chemical Company, Midland, Mich.

[21] Appl. No.: 896,687

[22] Filed: Aug. 15, 1986

[51] Int. Cl.$^4$ ............................................. C01F 11/28
[52] U.S. Cl. ................................. 423/497; 423/155; 210/188; 55/87; 55/178
[58] Field of Search ............... 423/497; 55/178, 87; 210/188

[56] References Cited

U.S. PATENT DOCUMENTS

| 2,780,360 | 2/1957 | Bon et al. | 55/178 |
| 2,857,244 | 10/1958 | Graves | 423/497 |
| 3,250,593 | 5/1966 | Wilcox et al. | 423/497 |
| 3,356,348 | 12/1967 | Paul, Jr. | 55/178 |
| 3,520,822 | 7/1970 | Traelnes | 55/178 |
| 3,616,610 | 11/1971 | Javorsky et al. | 55/178 |
| 3,810,970 | 5/1974 | McCormick | 423/497 |
| 3,811,247 | 5/1974 | Huppke | 55/178 |
| 3,826,816 | 7/1974 | McCormick | 423/497 |
| 4,258,007 | 3/1981 | Gragg et al. | 55/178 |
| 4,377,488 | 3/1983 | Gancy | 423/155 |

Primary Examiner—Andrew Metz
Assistant Examiner—Anthony McFarlane
Attorney, Agent, or Firm—E. E. Spielman; D. R. Howard

[57] ABSTRACT

This invention relates to a process for the production of an aqueous calcium chloride solution, which process comprises: locating a charge of calcium carbonate within a reaction vessel; and contacting an aqueous solution containing hydrochloric acid with the calcium carbonate charge to produce carbon dioxide and the aqueous calcium chloride solution. The carbon dioxide produces a foam at the top of the aqueous calcium chloride solution and entrains therewithin at least a portion of any fines contained in such solution. In one embodiment, the fines are removed from the reaction system by allowing the foam and its entrained fines to overflow the reaction vessel. In another embodiment, removal of the fines is achieved by providing a foam reservoir into which the foam and its entrained fines continuously enter and a defoaming mechanism for breaking down the entering foam.

7 Claims, 2 Drawing Figures

PROCESS FOR THE MANUFACTURE OF CALCIUM CHLORIDE

BACKGROUND OF THE INVENTION

This invention relates to a process and apparatus for the production of calcium chloride by the reaction of hydrochloric acid and calcium carbonate.

It is well known that an aqueous calcium chloride solution can be produced by the neutralization of aqueous hydrochloric acid with calcium carbonate. After process initiation, the produced calcium chloride containing aqueous solution is withdrawn from the reaction vessel and a portion thereof is recycled to an absorption tower into which is also fed hydrochloric acid and water. The resultant aqueous hydrochloric acid-calcium chloride solution is then fed to the neutralization reaction to provide the hydrochloric acid reactant. The aqueous calcium chloride solution fed to the absorber contains fines and must be first clarified, such as by filtration, so as to prevent pluggage of the recycle line and absorber. These fines may comprise bits of unreacted calcium carbonate and inerts which are associated with the calcium carbonate feed. If the calcium carbonate is provided by limestone, these inerts are usually silts which coexist with the limestone at the quarry. Since the concentration of fines can be considerable, the filters used must be frequently cleaned or replaced. This necessitates interruption of process operation and adds to the cost of the process.

It is therefore an object of this invention to provide a process for the production of an aqueous calcium chloride solution by the reaction of aqueous hydrochloric acid with calcium carbonate, which process removes fines from the aqueous calcium chloride solution without the use of a filter.

THE INVENTION

This invention relates to a process for the production of an aqueous calcium chloride solution having a highly reduced fines content. The process includes locating a charge of calcium carbonate within a reaction vessel and contacting this charge with an aqueous solution containing hydrochloric acid to produce carbon dioxide and an aqueous calcium chloride solution. This aqueous calcium chloride solution will, at this time, contain fines.

The carbon dioxide produced will generate a foam within the reaction vessel. The configuration of and conditions within the reaction vessel is such that foam generation is encouraged. It has been found that this foam entrains therewithin at least a portion of the fines in the aqueous calcium chloride solution.

In one embodiment, the process of this invention provides that the foam and its entrained fines be allowed to overflow the reactor thereby removing from the reactor that portion of the fines entrained by the foam.

In another embodiment, the process of this invention provides for the placement of a reservoir within the reaction vessel. The reservoir is located so that the foam and its entrained fines will move towards and continuously into the reservoir. As the foam is received into the reservoir, it is defoamed to produce a mixture comprising the constituents of and the entrained fines associated with the defoamed foam. This mixture, as it is produced, is removed from the reservoir to the exterior of the reaction vessel. From an economical standpoint, the defoaming is preferably effected by spraying the foam which enters the reservoir with water.

In a preferred embodiment, the process of this invention locates the calcium carbonate charge on a perforated floor which is a distance above the reaction vessel bottom. The perforated floor has openings measuring from about $\frac{1}{8}$ inch to about 1 inch which allow for the passage therethrough of calcium carbonate particles of a lesser size. The small particles collect in the bottom of the reactor to form a sludge which is periodically removed therefrom. By providing for the removal of these small particles from the calcium carbonate charge, it has been found that the charge does not become plugged to the passage of the aqueous hydrochloric acid feed therethrough. The small particles can be found in the calcium carbonate fed to the reaction vessel and can be produced during the calcium carbonate consuming reaction which continuously reduces the size of the calcium carbonate particles. The size of these small particles is too large for the above described entrained-in-foam removal technique used for fines removal.

In all embodiments, the aqueous calcium chloride solution is removed at a point below the foam-solution interface. This removed aqueous calcium chloride solution can be preferably split into two streams. One of the streams is used as a feed to a hydrochloric acid absorber to which is also added hydrochloric acid and water. Since the fines content of the aqueous calcium chloride solution has been greatly reduced, no filtration of this solution is needed prior to its feed to the absorber. The product from the absorber is an aqueous hydrochloric acid-calcium chloride solution which provides the hydrochloric acid feed to the reaction vessel. This feed is made at a location near the bottom of the calcium carbonate charge.

The other aqueous calcium chloride stream is treated with caustic for pH adjustment and for the formation of precipitates such as magnesium hydroxide and/or ferric hydroxide. The formation of this precipitate allows for the removal of the magnesium and iron constituents, if any, found in the aqueous calcium chloride solution. These precipitates are conveniently removed by filtration.

As can be seen from the foregoing, the clarification of the produced aqueous calcium chloride solution need not be achieved by filtration, but rather can be continuously achieved by removal of the carbon dioxide-produced foam and its entrained fines from the reaction vessel. Foam entrainment and removal does not entail the utilization of filters and their attendant maintenance costs.

These and other features contributing to satisfaction in use and economy in manufacture will be more fully understood from the following description of the preferred embodiments of this invention when take in connection with the accompanying drawings in which identical numerals refer to identical parts and in which

BRIEF DESCRIPTION OF THE DRAWINGS

In FIG. 1, there can be seen a reaction vessel, generally designated by the numeral 10. Reaction vessel 10 has a main body portion 12 which is preferably cylindrical in shape. This cylindrical shape is preferred as it lends itself to economical construction of reaction vessel 10 and is in harmony with the generation of foam produced by the hereinafter described reaction. Main body portion 12 is open at its upper end 14 and is connected at its lower end to conical wall 16. Conical wall 16 is valved at its apex 17.

Figure 1:
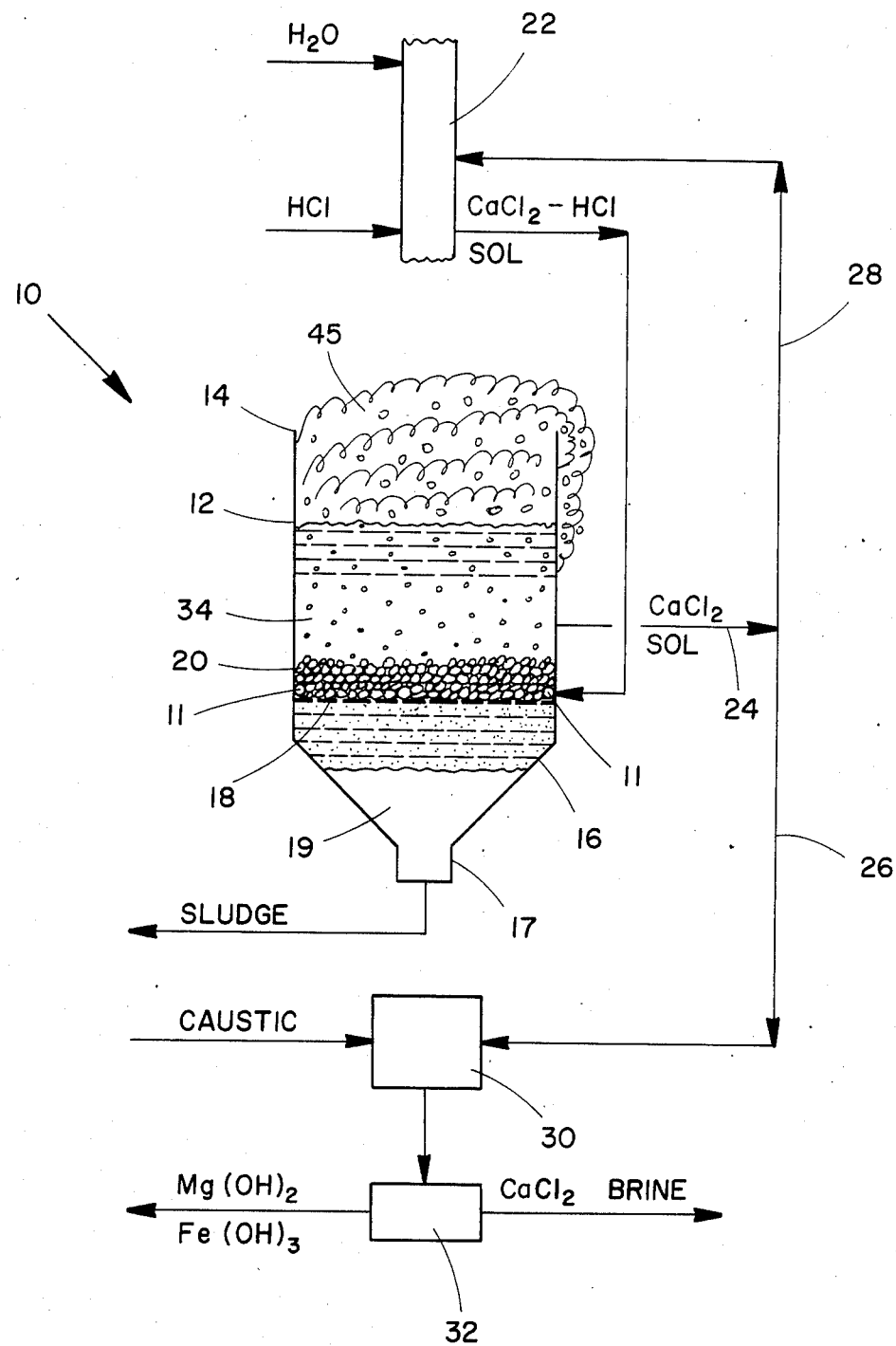
FIG. 1 is a partially schematic view showing a process and apparatus of this invention.

Located within the main body portion 12 is perforated tray 18. Perforated tray 18 is used for carrying a charge of calcium carbonate 20 within reaction vessel 10. The perforations in perforated tray 18 allow for the location of calcium carbonate charge 20 so that it is surrounded by liquid portion 34 of the reaction system contained in reaction vessel 10. Also, the perforations act as a screen to allow undersized particles of calcium carbonate to drop from calcium carbonate charge 20 and to settle to the bottom of conical portion 16 and thus form sludge 19. The perforation size is selected to suit the nature of the particular calcium carbonate charge used and can vary to allow for passage of particles as small as one-half inch or less all the way up to particles as large as 1 inch or less. When the level of sludge 19 approaches the height of perforate plate 18, the valved end 17 of conical portion 16 is opened and the sludge level is reduced.

To initiate the process shown in FIG. 1, a solid particulate calcium carbonate charge 20 is fed to perforate plate 18 and hydrochloric acid and water are fed to absorber 22. (Additional solid calcium carbonate is added to maintain the original charge volume as needed during the continuous operation of the process.) The resultant aqueous hydrochloric acid solution is then fed to reaction vessel 10 via manifold 11 which is located near the bottom of charge 20. The initial aqueous hydrochloric acid solution contains up to about 36 weight percent hydrochloric acid. When the liquid level in reaction vessel rises above product discharge line 24, a predominantly calcium chloride aqueous solution is removed from reaction vessel 10 and formed into two streams, a product stream 26 and a recycle stream 28. Generally, recycle stream 28 comprises about 85 percent of the predominantly calcium chloride aqueous solution removed from reaction vessel 10. The recycle stream is fed to absorber 22 and absorbs, along with the water fed to absorber 22, the hydrochloric acid fed to absorber 22. With the feed of recycle stream 28 to absorber 22, the amount of water fed at process initiation is reduced. After steady state operations are achieved, the resultant aqueous hydrochloric acid-calcium chloride solution from absorber 22 will contain from about 2 to about 11 weight percent hydrochloric acid and from about 28 to about 45 weight percent calcium chloride. At steady state, the predominantly calcium chloride aqueous solution removed from reaction vessel 10 via discharge line 24, to make up recycle stream 28 and product stream 26 will contain from about 28 to about 45 weight percent calcium chloride.

Product stream 26 is fed to vessel 30 to which is additionally fed caustic, e.g., 50% aqueous sodium hydroxide. The caustic feed is used to neutralize the excess acid and to precipitate impurities e.g., magnesium and iron, from the solution. Generally, the neutralized solution will have an OH ion concentration of 5 to 50 milliequivalents of $^-$OH per liter. This precipitate can be removed by filtration, centrifuging, etc. For the embodiment shown in FIG. 1, a filtration vessel is used. A calcium chloride brine is removed from filtration vessel 32 as filtrate. This brine will have a weight percent calcium chloride slightly lower than that found in product stream 26 due to the addition of the caustic.

In accordance with this invention, the predominantly calcium chloride aqueous solution removed from reaction vessel 10 via line 24 is essentially free of fines. Thus, no filtration of reflux stream 28 is needed and the attenduant disadvantages of such filtrations are avoided.

Fines removal from liquid portion 34 of the reaction system is achieved passively by the use of the production of $CO_2$ which causes liquid portion 34 to foam at its surface. The $CO_2$ is formed at the surface of the calcium carbonate particles and rises to the surface of liquid portion 34. This movement provides for a likewise transfer of fines to the surface of liquid portion 34. A foam, designated by the numeral 45, is produced at this surface. This foam entrains the fines therewithin. The volume of foam 45 continues to build and it reaches upper end 14 and ultimately overflows reaction vessel 10. The height of that part of main body portion 12, which part is above the maximum level expected to be achieved by liquid portion 34, should be sufficiently high to encourage production of foam 45 but not so high as to restrict overflow of foam 45 due to the weight of the foam and due to foam breakdown. The optimum height for body portion 12 to extend above the level of liquid portion 34 is best determined empirically. The optimum height will depend upon reaction vessel dimensions and configuration, the amount of fines present, and the quality and quantity of foam produced. For example, in the case of; a reaction vessel having a cylindrical main body portion with a 12 foot diameter, a limestone charge of 45,000 pounds, and an aqueous hydrochloric acid-calcium chloride solution feed of 15,800 pounds/hour containing 5 weight percent hydrochloric acid, a height of from about 15 to about 20 feet is suitable.

The various above-described reactions, absorption, filtration, etc., can conveniently occur at the ambient levels found in the pieces of equipment in which the particular process is occurring. It is desirable to cool reflux stream 28 by means of a heat exchanger (not shown) prior to its entry into absorber 22. This cooling may be necessary as there is a heat of solution realized with the mixing of the hydrochloric acid and water and as the reaction occurring in reaction vessel 10 is exothermic.

Figure 2:
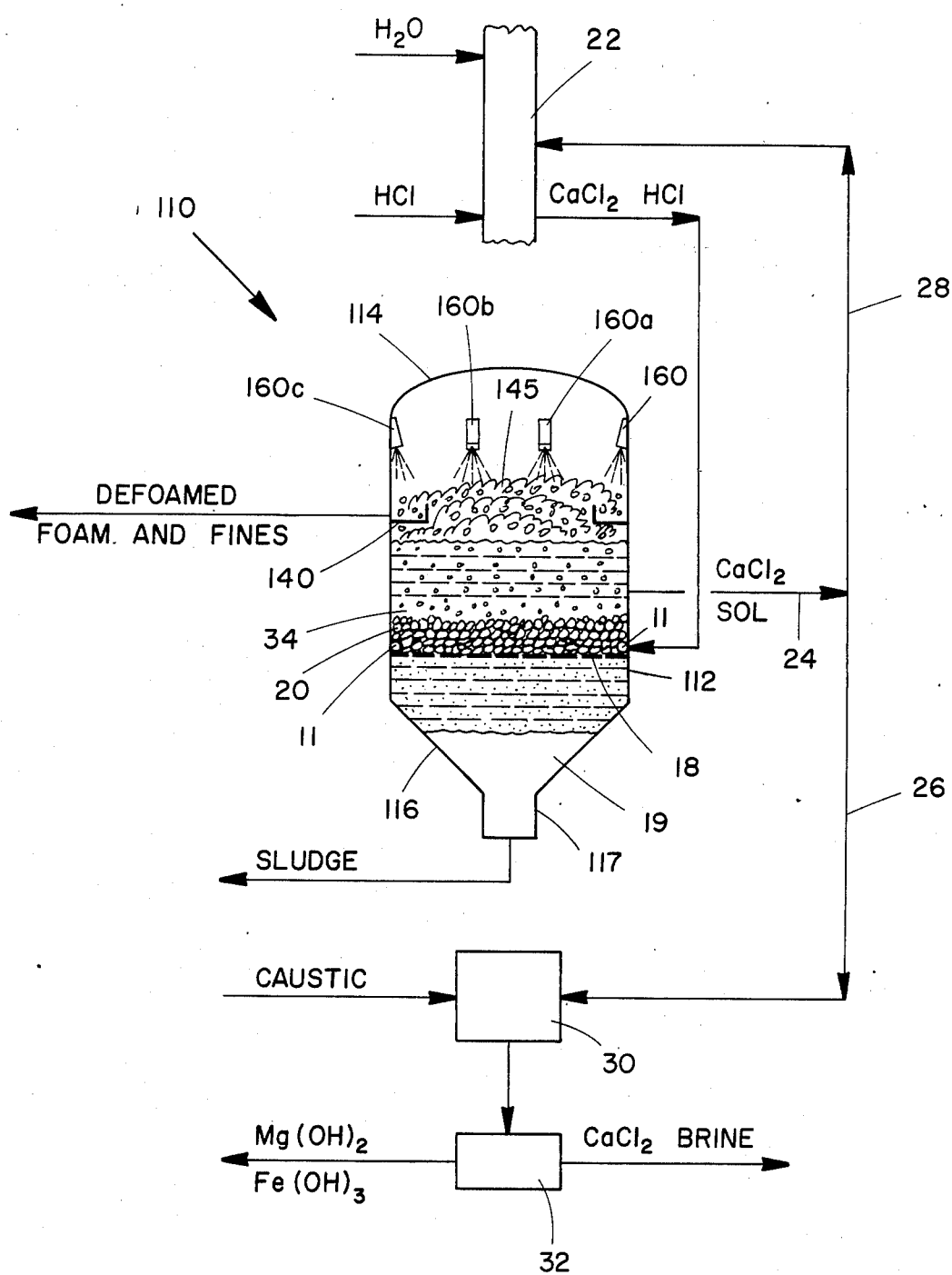
FIG. 2 is a partially schematic view showing a second process and apparatus of this invention.

FIG. 2 illustrates a second embodiment of this invention. This second embodiment is identical in all respects to the first described embodiment of FIG. 1 except that the reaction vessels of FIGS. 1 and 2 are different in design and in their method of removing the foam and its entrained fines from the reaction vessels. Thus, where so designated by identical numerals and labels, the descriptions of those streams, reactants, absorbers, vessels, etc., above given relative to the embodiment of FIG. 1 are equally applicable to the embodiment of FIG. 2 and will not be repeated again.

Referring now to FIG. 2, there can be seen a reaction vessel, generally designated by the numeral 110. Reaction vessel 110 has a main body portion 112 and is closed at its upper end by top wall 114. While reaction vessel 110 is shown closed at its top by top wall 114, it is to be understood that the embodiment of FIG. 2 is equally operable with an opened top reaction vessel. At the bottom end of main body portion 112 is conical wall 116 which is valved at its apex 117. When sludge 19 builds up to approach perforate plate 118 the valve is opened to lower the sludge level.

Perforate plate 18 is located within main body portion 112 so as to carry and locate a solid particulate charge so that it is surrounded by liquid portion 34 of the reaction system contained within reaction vessel 110. The sizing of the perforations in perforate plate 18 is done in the same manner described previously for perforate plate 18 shown in FIG. 1.

An annular foam reservoir 140 is located within main body portion 112 at a height which is above the maximum level expected to be achieved by liquid portion 34 but below the maximum height expected for foam 145. Foam reservoir 140 is coaxial with the longitudinal axis of reaction vessel 110 and is open at its upper end so that the growing volume of foam 145 will move towards and continuously into foam reservoir 140. As foam 145 enters foam reservoir 140 it is defoamed, i.e., it is broken down to yield a liquid-solid mix comprising the constituents of and the entrained fines associated with foam 145. Defoaming can be inexpensively achieved by spraying water onto foam 145 as it enters foam reservoir 140. For this purpose there is provided spray heads 160, 160a, 160b, and 160c. Other defoaming techniques may be utilized so long as the defoaming product is flowable from foam reservoir 140. When water is used, the resultant liquid-fines mix is drained from reservoir 140 to the exterior of reaction vessel 110.

The methods of transporting the fines within liquid portion 34 and of entraining same in foam 145 produced at the surface of liquid portion 34 are the same as previously described for the embodiment shown in FIG. 1.

All processing equipment and their associated piping should be of materials which are not corroded by the solutions, etc., which they handle. Fiberglass and rubber-lined steel are suitable materials.

While certain reactor configurations are specifically described above and shown in FIGS. 1 and 2, it is to be understood that other configurations are also useful. For example, reaction vessel 110 can have a non-cylindrical main body portion. In this case, the foam reservoir is not annular but rather is located against the inside wall of the main body portion and follows its contours.

We claim:

1. A process for the production of an essentially fines-free aqueous calcium chloride solution, which process comprises:
   (a) providing a calcium carbonate charge in a reaction vessel;
   (b) continuously feeding aqueous hydrogen chloride into said reaction vessel to react with said calcium carbonate and to form a body of liquid within said reaction vessel, wherein said body of liquid which contains fines, surrounds said calcium carbonate charge, the reaction between said aqueous hydrochloric acid and said calcium carbonate forming carbon dioxide and aqueous calcium chloride whereby
       (i) said aqueous calcium chloride forms at least part of said body of liquid,
       (ii) said carbon dioxide forms a foam on the upper surface of said body of liquid, and
       (iii) said carbon dioxide transports at least a part of said fines in said body of liquid to said foam wherein at least a part of the transported fines are entrapped in said foam;
   (c) continuously removing, at a point below the interface of said foam and said upper surface of said body of liquid, a part of said body of liquid; and
   (d) overflowing said foam with its entrapped fines from said reaction vessel.

2. The process of claim 1 wherein said charge of calcium carbonate is located on a perforated floor.

3. The process of claim 2 wherein said calcium carbonate is provided by limestone.

4. A process for the production of an essentially fines free aqueous calcium chloride solution, which process comprises:
   (a) providing a calcium carbonate charge in a reaction vessel;
   (b) continuously feeding aqueous hydrogen chloride into said reaction vessel to react with said calcium carbonate and to form a body of liquid within said reaction vessel, wherein said body of liquid which contains fines surrounds said calcium carbonate charge, the reaction between said aqueous hydrochloric acid and said calcium carbonate forming carbon dioxide and aqueous calcium chloride whereby
       (i) said aqueous calcium chloride forms at least a part of said body of liquid,
       (ii) said carbon dioxide forms a foam on the upper surface of said body of liquid, and
       (iii) said carbon dioxide transports at least a part of said fines in said body of liquid to said foam wherein at least a part of the transported fines are entrapped in said foam;
   (c) continuously removing, at a point below the interface of said foam and said upper surface of said liquid portion, a part of said liquid portion; and
   (d) placing a reservoir in said reaction vessel, said reservoir being located so that said foam and its entrained fines will move towards and continuously into said reservoir;
   (e) defoaming said foam which enters said reservoir, said defoaming producing a mixture comprising the constituents of and the entrained fines associated with said defoamed foam; and
   (f) removing from said reservoir to the exterior of said reaction vessel said mixture.

5. The process of claim 4 wherein said charge of calcium carbonate is located on a perforated floor.

6. The process of claim 5 wherein said calcium carbonate is provided by limestone.

7. The process of claim 4 wherein said defoaming is effected by spraying the foam which enters said reservoir with water.

* * * * *